June 22, 1965  R. ASHTON ETAL  3,190,392
FOLDING LADDER FOR COMBINES
Filed Jan. 31, 1963  2 Sheets-Sheet 1

INVENTORS.
ROBERT ASHTON &
BY WILBERT WEBER

ATTORNEYS.

June 22, 1965  R. ASHTON ETAL  3,190,392
FOLDING LADDER FOR COMBINES
Filed Jan. 31, 1963  2 Sheets-Sheet 2

INVENTORS.
ROBERT ASHTON &
BY WILBERT WEBER

ATTORNEYS.

United States Patent Office

3,190,392
Patented June 22, 1965

3,190,392
FOLDING LADDER FOR COMBINES
Robert Ashton, Islington, Ontario, and Wilbert Weber, Nashville, Ontario, Canada, assignors to Massey-Ferguson Limited, Toronto, Ontario, Canada, a corporation of Canada
Filed Jan. 31, 1963, Ser. No. 255,234
4 Claims. (Cl. 182—97)

The present invention relates generally to vehicle access ladders and concerns, more particularly, an operator's platform ladder for agricultural combines.

The operator's station on an agricultural combine is normally a "platform" located at the front of the vehicle and disposed well up in the vehicle frame so as to give the operator a good view of the crop cutting and feeding action of his machine. An access ladder is therefore needed to enable the operator to climb to and from the platform.

The present invention lies in an access ladder that folds from a downwardly extending, step defining position to a horizontal storage position that is well clear of the operating parts of the combine and in which the ladder completes a guard rail encircling the platform without increasing the lateral width of the vehicle.

An example of the inventive folding ladder structure is shown in the accompanying drawings, in which.

Figure 2:
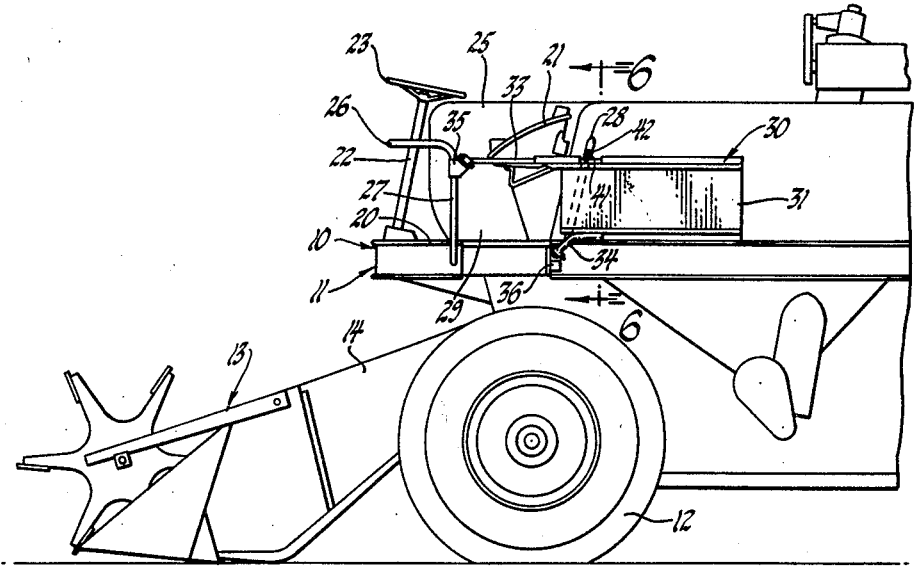
FIG. 2 is similar to FIG. 1 and shows an alternate position of the parts.
Figure 3:
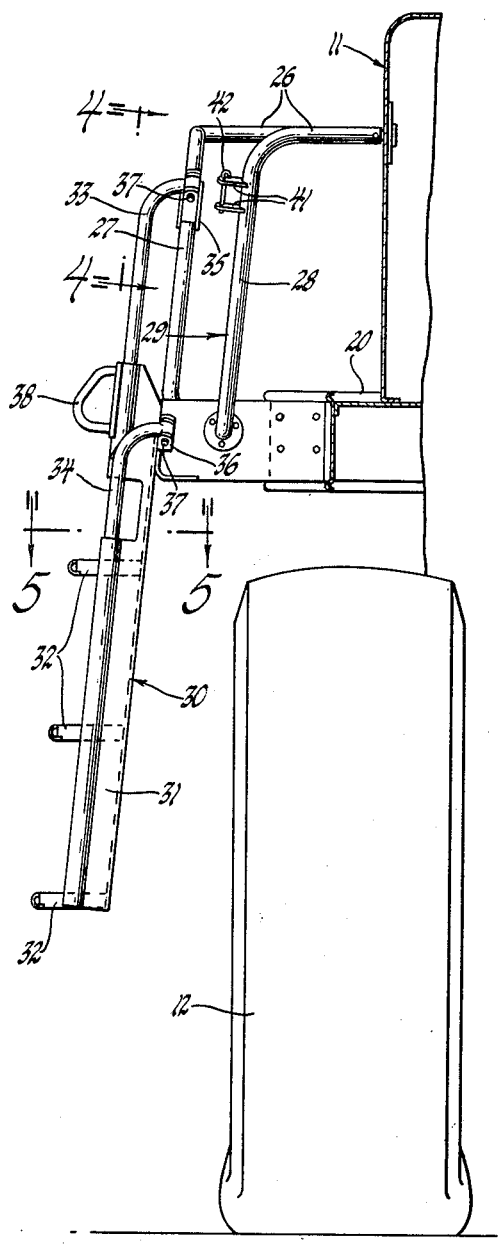
FIG. 3 is an enlarged fragmentary section taken approximately along the line 3—3 in FIG. 1.
Figure 4:
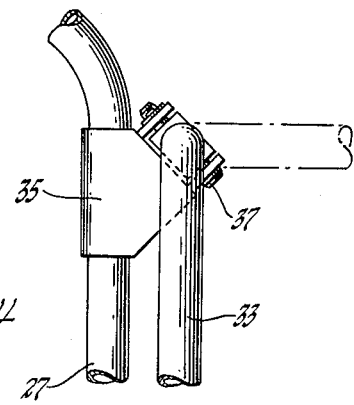
Figure 5:
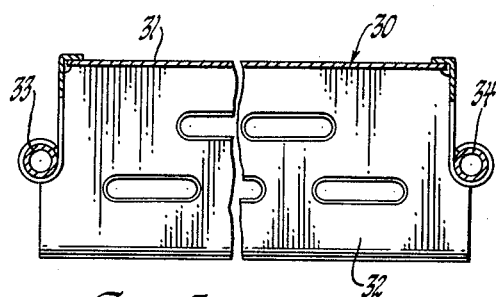
Figure 6:
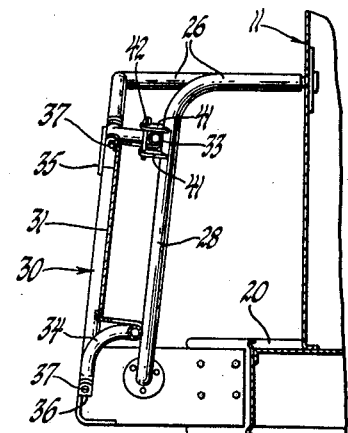

FIGS. 4 and 5 are fragmentary sections taken respectively along the lines 4—4 and 5—5 in FIG. 3; and FIG. 6 is an enlarged fragmentary section taken approximately along the line 6—6 in FIG. 2.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Figure 1:
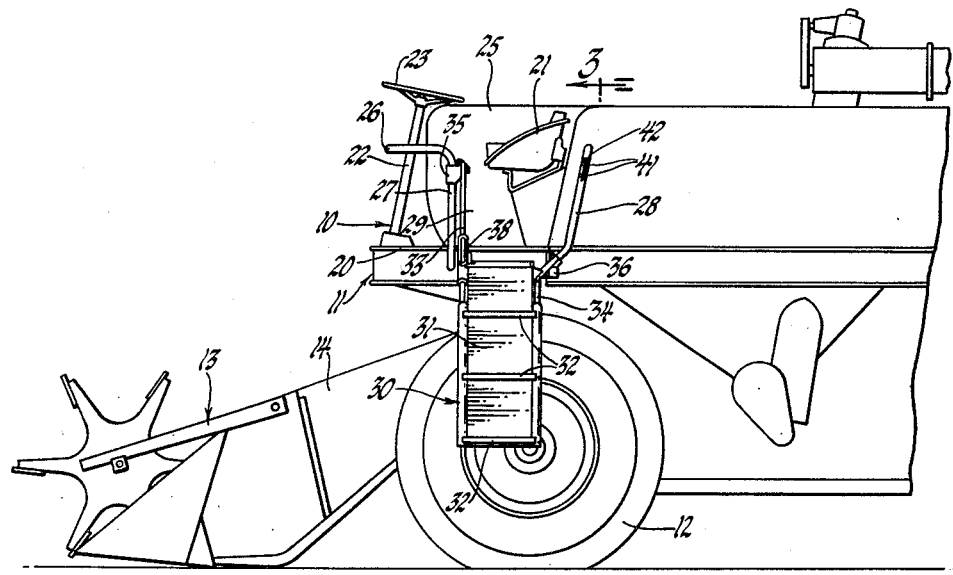
FIGURE 1 is a fragmentary side elevation of a combine embodying the invention.

Turning first to FIGS. 1 and 2, there is fragmentarily shown a combine 10 embodying the invention which includes a frame or body 11 that is supported by a plurality of ground engaging wheels of which only the front drive wheel 12 appears in the drawings. At the left in FIGS. 1 and 2, the forward end of the combine, a header assembly 13 is mounted which includes an elevator housing 14.

To give the combine operator a clear view of the crop cutting and feeding action of his machine, the combine 10 is provided with an operator's platform 20 located at the top front of the body 11 above the level of the drive wheel 12. The platform 20 carries an operator's seat 21 and a control column 22 on which a steering wheel 23 for the combine is mounted. It will be appreciated that because of the elevated and forward position of the operator's platform 20, the operator is provided with an unobstructed view down and forward of the machine.

For safety, the platform is partially surrounded by a portion 25 of the body 11 and a guard rail 26 having turned down portions 27 and 28 that define an access opening 29.

Pursuant to the invention, a ladder 30 extends downwardly from the platform 20 at the opening 29, as shown in FIG. 1, and is pivoted for swinging movement along an inclined axis which enables the ladder to fold upwardly alongside the platform and across the opening 29, as shown in FIG. 2. Preferably, the ladder 30 swings on an axis that lies at approximately 45° from the vertical so that, when the ladder is in folded position, it lies flush against the combine body 11 in a substantially horizontal position.

In its illustrated form, the ladder 30 includes a sheet metal frame 31 supporting a plurality of rigidly positioned steps 32 and a pair of opposite side rails 33 and 34. The forwardmost rail 33 extends approximately to the top of the guard rail 26 and the other rail 34 extends approximately to the level of the platform 20. The upper ends of the rails 33, 34 are hinged in brackets 35 and 36, respectively, with pivot pins 37 defining axes that are alined and disposed at approximately a 45° angle with respect to the vertical.

For convenience in swinging the ladder 30 about the pivot pin 37, a hand hold 38 is mounted on the side rail 33. The hand hold 38 gives the operator a convenient grasping point which is spaced from the folding axis so that the ladder can be quickly and easily swung from its downwardly extending position to its storage position alongside the combine body. Since the side rail 33 is pivoted near the top of the guard rail 26, it will be appreciated that the rail 33, when the ladder is in its upwardly folded FIG. 2 position, closes the access opening 29 so as to complete the encirclement of the platform 20 for the safety of the operator when the machine is in use.

To releasably lock the ladder 30 in its upwardly folded position, the side rail 34 slips between a pair of ears 41 extended outwardly from the guard rail portion 28 when the ladder is alongside the combine body 11. The operator, by dropping a lock pin 42 through openings formed at the outer ends of the ears 41, securely latches the ladder in its raised position (see particularly FIGS. 3 and 6).

The embodiments of the invention in which an exclusive property or privilege is claimed are defined as follows:

1. In a combine having an elevated operator's platform with a ladder extending downwardly from an access opening through the plane of said platform, the improvement comprising means pivoting said ladder along an inclined axis extending through points above and approximately in the plane of said platform enabling the ladder to fold upwardly alongside the platform and across said opening.

2. The combination of claim 1 in which said axis is at approximately 45° from the vertical and the ladder swings upwardly and rearwardly of the combine from its downwardly extending position into a substantially horizontal position flush against the combine.

3. In a vehicle having an elevated platform partially surrounded by a guard rail, the combination comprising, a ladder extending downwardly from said platform so as to provide access to the platform through an opening in said guard rail, said ladder having opposite side rails one extending approximately to the top of said guard rail and the other up to said platform, and means pivoting the upper ends of said side rails to the guard rail and the platform, respectively, on alined inclined axes so that the ladder may be folded alongside said platform with said one side rail across said opening.

4. The combination of claim 3 including a latch for releasably locking said ladder in its upwardly folded position.

References Cited by the Examiner
UNITED STATES PATENTS

| 2,382,370 | 8/45 | Tully | 182—97 |
| 2,657,940 | 11/53 | Davidson | 182—97 |
| 2,967,584 | 1/61 | Westerlund | 182—97 |

HARRISON R. MOSELEY, *Primary Examiner.*
REINALDO P. MACHADO, *Examiner.*